(12) United States Patent
Choi et al.

(10) Patent No.: US 10,877,863 B2
(45) Date of Patent: Dec. 29, 2020

(54) AUTOMATIC PREDICTION SYSTEM FOR SERVER FAILURE AND METHOD OF AUTOMATICALLY PREDICTING SERVER FAILURE

(71) Applicant: GLUESYS, CO, LTD., Anyang-si (KR)

(72) Inventors: Seung Ho Choi, Seoul (KR); Jae Chun No, Seoul (KR); Gyeong Hun Kim, Suwon-si (KR); Hyung Jun Seo, Seoul (KR); Jae Hwan Kim, Seoul (KR)

(73) Assignee: GLUESYS, CO, LTD., Anyang-si (KR)

( * ) Notice: Subject to any disclaimer, the term of this patent is extended or adjusted under 35 U.S.C. 154(b) by 130 days.

(21) Appl. No.: 16/271,837

(22) Filed: Feb. 10, 2019

(65) Prior Publication Data

US 2020/0125465 A1 Apr. 23, 2020

(30) Foreign Application Priority Data

Oct. 23, 2018 (KR) .................... 10-2018-0126561

(51) Int. Cl.
| | |
|---|---|
| *G06F 11/00* | (2006.01) |
| *G06F 11/22* | (2006.01) |
| *G06N 3/04* | (2006.01) |
| *G06N 3/08* | (2006.01) |

(52) U.S. Cl.
CPC .......... *G06F 11/2263* (2013.01); *G06N 3/04* (2013.01); *G06N 3/08* (2013.01)

(58) Field of Classification Search
CPC ........ G06F 11/2263; G06N 3/02; G06N 3/04; G06N 3/08
See application file for complete search history.

(56) References Cited

U.S. PATENT DOCUMENTS

| | | | | |
|---|---|---|---|---|
| 10,769,043 | B2* | 9/2020 | Sabharwal | .......... G06F 11/2263 |
| 2017/0293542 | A1* | 10/2017 | Xu | .......... G06N 3/084 |
| 2017/0293543 | A1* | 10/2017 | Xu | .......... G06F 11/008 |
| 2019/0095301 | A1* | 3/2019 | Sim | .......... G06F 11/2263 |

FOREIGN PATENT DOCUMENTS

| | | |
|---|---|---|
| KR | 10-1758870 | 7/2017 |
| KR | 10-1793723 | 11/2017 |
| KR | 10-1827108 | 2/2018 |
| KR | 10-1892516 | 10/2018 |

* cited by examiner

*Primary Examiner* — Jonathan D Gibson
(74) *Attorney, Agent, or Firm* — Mark M. Friedman

(57) ABSTRACT

The present invention relates to an automatic prediction system for a server failure, which monitors the status of a single server connected to a network and providing web, DB and network services, and predicts and warns a server failure of a target system by using the collected status data of the single server.

The automatic prediction system for a server failure comprises: a data collection module to collect status information of a server and service of a target system; a model generation and optimization module to generate a CNN-based failure prediction model by using the collected data and to optimize model parameters and hyper-parameter values; and a prediction module to perform online failure prediction by using the optimized CNN-based failure prediction model.

4 Claims, 4 Drawing Sheets

AUTOMATIC PREDICTION SYSTEM FOR SERVER FAILURE AND METHOD OF AUTOMATICALLY PREDICTING SERVER FAILURE

TECHNICAL FIELD

The present invention relates to an automatic prediction system for a server failure and a method of automatically predicting a server failure, and more particularly, to an automatic prediction system for a server failure, which monitors the status of a single server connected to a network and providing web, DB and network services, and predicts and warns a server failure of a target system by using the collected status data of the single server.

BACKGROUND ART

To generate an optimized prediction model for a server failure by using a machine learning technique, it needs to properly pre-process data and to optimize hyper-parameters related to a model design as well as model parameter learning.

Hyper-parameters are variables which are set by people based on priori knowledge or which are automatically set through an external model mechanism. Hyper-parameters are referred to as meta-parameters. Typical hyper-parameters include learning rate, cost function, regularization parameter, mini-batch size, the number of learning repetition, the number of hidden units and weight initialization.

In other words, since generating an optimized prediction model for a server failure by using a machine learning technique is performed by generating, learning, evaluating and comparing diverse models by applying various hyper-parameter values as well as various pre-processing technique, a lot of user intervention is required. Further, since each process is determined by user intuition, it is difficult to extract a prediction model of good performance.

The conventional techniques of optimizing a failure prediction model have been researched and developed from the aspects of: 1) technique of comparing various classification algorithms, 2) technique of pre-processing proper data for prediction, and 3) technique of combining the data pre-processing technique and the classification algorithm.

In the technique of comparing various classification algorithms, the previous research had compared performance by respectively generating a statistical model based on a data describing hypothesis and a machine learning model based on a learning theory. Recently, the machine learning model has better performance, compared to the statistical model due to complicated data. Machine learning models typically used for prediction include a support vector machine (SVM) and a random forest. Further, a neural network-based prediction model has been gradually introduced. The performance of these machine learning models has been verified in the fields of image and sound. The models for failure prediction have shown good classification performance and have been generally used. For the proper operation of these models, data pre-processes and hyper-parameter values are to be properly applied for data. However, there is a limit in optimizing a model in the field of failure prediction since the forgoing processes are performed empirically by user intuition.

In the technique of pre-processing data to optimize a prediction model, data pre-processes are performed by properly combining the processes of feature extraction, transform and selection, as an example, log filtering and classifying (Korean Patent No. 1758870 entitled "Mining monitoring system and mining monitoring method in using same"). However, in this technique, since a data pre-process and a classification process are respectively optimized by steps, the entire processes are not optimized. In the recent machine learning, the data pre-process and classification process are optimized on the whole by end-to-end learning, showing excellent performance. However, there has yet to be any case of applying the end-to-end learning to the failure prediction technique.

By combining the data pre-processing technique and the classification algorithms, user intervention is minimized and various algorithms are automatically compared to generate an excellent prediction model for a failure. However, since the number of hyper-parameters and classification algorithms to be applied is too many, the calculation cost is too much. Therefore, a failure prediction model has been generated by applying only a part of available classification algorithm sets.

DISCLOSURE

Technical Problem

Therefore, it is an object of the present invention to solve the above problems and to provide an automatic prediction system for a server failure, to generate and apply a prediction model which is automatically optimized by learning proper data pre-processes for a classifier and strategically exploring hyper-parameter values based on probability theory by using the automated machine learning to learn the data pre-processes and hyper-parameters.

It is a further object of the present invention to provide an automatic prediction system for a server failure, to collect failure-related data as much as possible, thereby monitoring and providing the data.

It is a further object of the present invention to provide an automatic prediction system for a server failure, to automate generation and optimization of an automatic prediction model for a server failure, thereby minimizing user intervention.

It is a further object of the present invention to provide an automatic prediction system for a server failure, to automate the data pre-processes by feature learning and to optimize the data pre-processes and failure prediction not separately but simultaneously.

It is a further object of the present invention to provide an automatic prediction system for a server failure, to reduce costs required for optimization by strategically exploring the hyper-parameter values which are applied to the design and learning of the automatic prediction model for a server failure and to adjust important hyper-parameters in more detail for optimization.

Technical Solution

The present invention provides an automatic prediction system for a server failure comprising: a data collection module to collect status information of a server and service of a target system; a model generation and optimization module to generate a convolution neural network (CNN)-based failure prediction model by using the data collected and to optimize parameters and hyper-parameter values of the model; and a prediction module to perform online failure prediction by using the optimized CNN-based failure prediction model.

Advantageous Effects

The automatic prediction system for a server failure according to the present invention prevents damage by predicting in advance the server failure and minimizes difficulties in applying the machine learning and in monitoring the failure prediction model by automating the prediction for failure.

DESCRIPTION OF DRAWINGS

The above and other features and advantages of the present invention will become more apparent by describing in detail exemplary embodiments thereof with reference to the attached drawing(s) in which.

MODE FOR INVENTION

An automatic prediction system for a server failure according to the present invention is to monitor the status of a single server which is connected to a network and provides web, DB and network services; to predict and warn a server failure of a target system by using collected data; to generate an automatically optimized predict model for a failure by using an automated machine learning technique; and to apply the model in predicting the server failure of the target system.

The present invention will now be described more fully hereinafter with reference to the accompanying drawing(s), in which preferred embodiments of the invention are shown.

Figure 1:
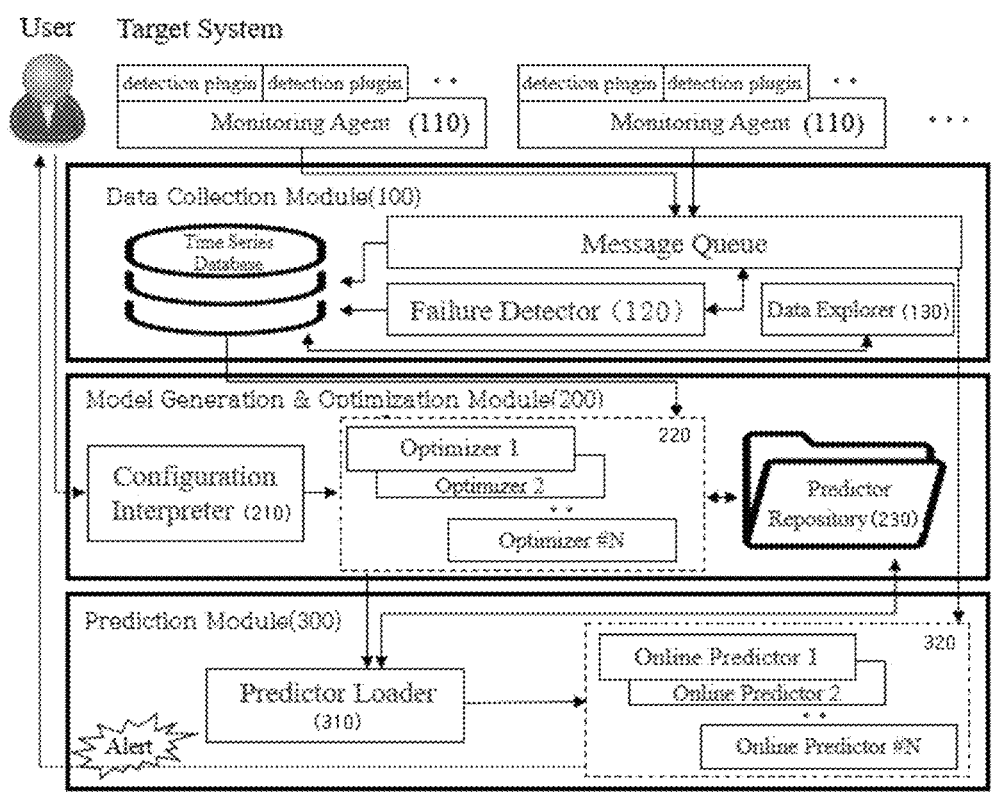
FIG. 1 is a schematic block diagram of the structure of an automatic prediction system for a server failure according to the present invention.

FIG. 1 is a schematic block diagram of the structure of an automatic prediction system for a server failure according to the present invention.

The structure of the automatic prediction system for a server failure comprises a data collection module 100, a model generation and optimization module 200 and a prediction module 300.

The data collection module 100 collects status information of servers and services of a target system and extracts the relevant event when a failure occurs. When the failure-related data are collected, a user defines a value to be predicted and a prediction model and submits the value and the model to a framework. The model generation and optimization module 200 generates the model defined by the user by using the collected data and optimizes parameters and hyper-parameter values of the model. The optimized model is stored in a repository, to be informed to the prediction module 300 to perform online failure prediction by using the relevant model and to warn the user a failure occurrence if the failure occurs.

The structure of each module will be described as follows:

Data Collection Module 100

The data collection module 100 comprises a monitoring agent 110, a failure detector 120 and a data explorer 130.

The monitoring agent 110 periodically collects the status information of the component constituting the target system and the status information of the operating services of the target system by detection plug-in. The collected data are stably monitored through a message queue, to be stored in a time series database 140 or used for online failure prediction.

To generate a failure prediction model, failure data are to be learned. With more failure data available, better prediction models are generated. Therefore, the failure detector 120 detects failure data occurring in the target system, to be used to improve a previous failure prediction model or generate a new model in the future. The automatic prediction system for a server failure according to the present invention detects failure data when a log error occurs.

The data explorer 130 makes it possible for the user to check the collected data and conduct a basic analysis such as data distribution and correlation. A system manager is able to properly cope with failure by analyzing the results of failure prediction by using the basic analysis.

Model Generation and Optimization Module 200

The model generation and optimization module 200 comprises a configuration interpreter 210, an optimizer 220 and a predictor repository 230.

Figure 2:
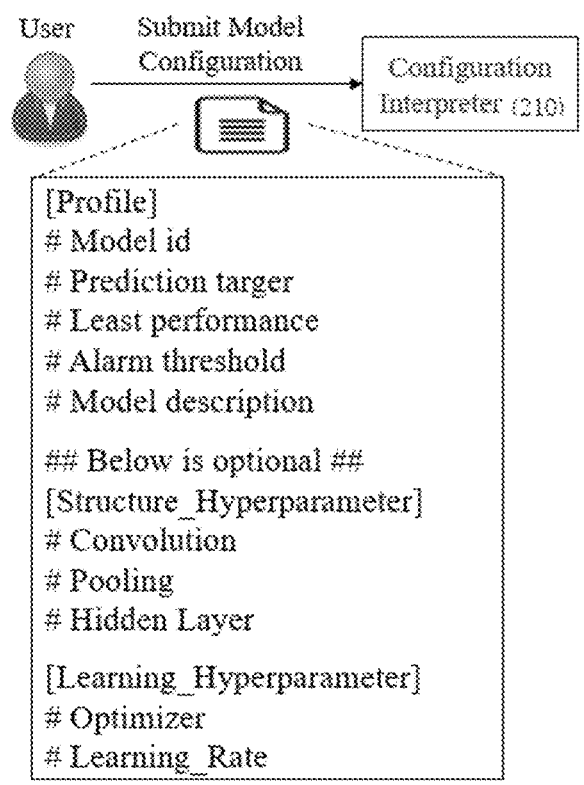
FIG. 2 is an example of a model configuration form submitted by a user according to the present invention and a block diagram of a process of submitting the model.

When the user submits model configuration information, for example, as shown in FIG. 2, the configuration interpreter 210 interprets the submitted model configuration information, generates a number of the optimizers 220 and transfers the interpreted model configuration information to the optimizers 220.

The optimizers 220 generate a prediction model based on the interpreted model configuration information and optimize the prediction model by applying the machine learning and hyper-parameter tuning techniques. If the optimized prediction model satisfies special performance, that is, a special level of failure prediction performance, the relevant prediction model is stored in the predictor repository 230.

Prediction Module 300

The prediction module 300 comprises a predictor loader 310 and a number of online predictors 320. When the predictor loader 310 receives a notice that a new prediction model is updated, the predictor loader 310 calls the relevant prediction model from the predictor repository 230, to generate the online predictors 320. The online predictors 320 predict a failure by receiving the currently collected information of the target system and warn the user when the probability of failure occurrence is more than a predetermined limit.

The failure prediction model according to the present invention, which is based on the automatic prediction system for a server failure as described above, is based on a convolution neural network (CNN).

The failure prediction model predicts a future failure by discerning the status of the current target system, based on the input status data of the target system. The prediction model is defined by data input, data pre-processes and classification algorithms.

Figure 3:
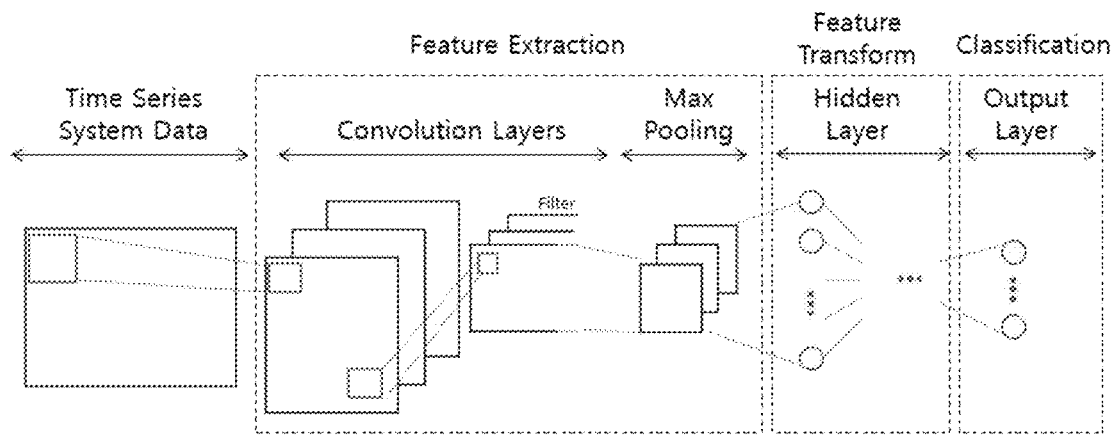
FIG. 3 is a schematic view of the structure of a convolution neural network (CNN)-based failure prediction model.

As shown in FIG. 3, the data which are input in the CNN-based prediction model are the quantified data of the status of the servers of the target system and the status of the operating services of the target system, which are stored through the data collection module 100. These data are time series data, indicating the status of the target system according to a time change. The prediction model predicts a failure after a predetermined time when the time series data are taken by predetermined time units. Therefore, from dozens of feature values to several hundreds of feature values are input in the prediction model by a time unit, namely, over a period.

The CNN-based prediction model performs the data pre-processes through feature extraction and transform to the input time series data and classifies whether or not a failure occurrence in a near future by using the pre-processed data.

The CNN-based prediction model comprises a convolution layer, a pooling layer, a hidden layer and an output layer. The data pre-processes, that is, feature extraction and transform, are performed in the convolution layer and pooling layer. The convolution layer is to extract a significant feature as a layer to extract a convolution feature. The pooling layer is a sub-sampling layer to reduce the convolution feature. Further, the output layer classifies whether or not a failure occurrence took place by using the data which have been pre-processed in the convolution layer and the pooling layer.

Generally, the CNN-based prediction model is a structure to be used for classification. The proper data pre-processes for the prediction model are automated through feature learning. The pre-processes and the prediction are performed simultaneously, so that more proper pre-processes for data are preformed and the user's costs for the pre-processes are reduced. Further, since the input data are in the time series form of various status values of the target system, a lot of data are contained to be suitable for a convolution calculation process. Therefore, the CNN-based prediction model described above generates the final failure prediction model, along with the optimization process to be stated below:

The automatic prediction system for a server failure according to the present invention generates the prediction model of a single server failure by using the data collected through the data collection module 100 and strategically optimizes the generated model based on the probability algorithm.

A method of automatically predicting a sever failure by using the automatic prediction system for a server failure according to the present invention is characterized by generally automating the processes of collecting data, generating a prediction model, optimizing the model and applying the model. Specifically, the method of automatically predicting a server failure comprises the steps of: collecting data by a collection module, generating and optimizing a failure prediction model by an optimizer, and predicting a failure of a target system by using the failure prediction model and storing the results.

That is, the step of collecting data is performed by a monitoring agent 110 of a data collection module 100. When the monitoring agent 110 is structured in the target system that a user wants to predict, the monitoring agent 110 periodically collects data of the system source through an operating system. The collected data are in the key-value form representing a data name and numerical value and generally called "metric". The system sources to be collected are main memory, auxiliary memory, network and CPU and represent each source's information, speed and utilization/availability. Further, the monitoring agent 110 collects data by tracking the status information of the operating services in the target system, thereby enabling more proper failure prediction for a specific service.

Figure 4:
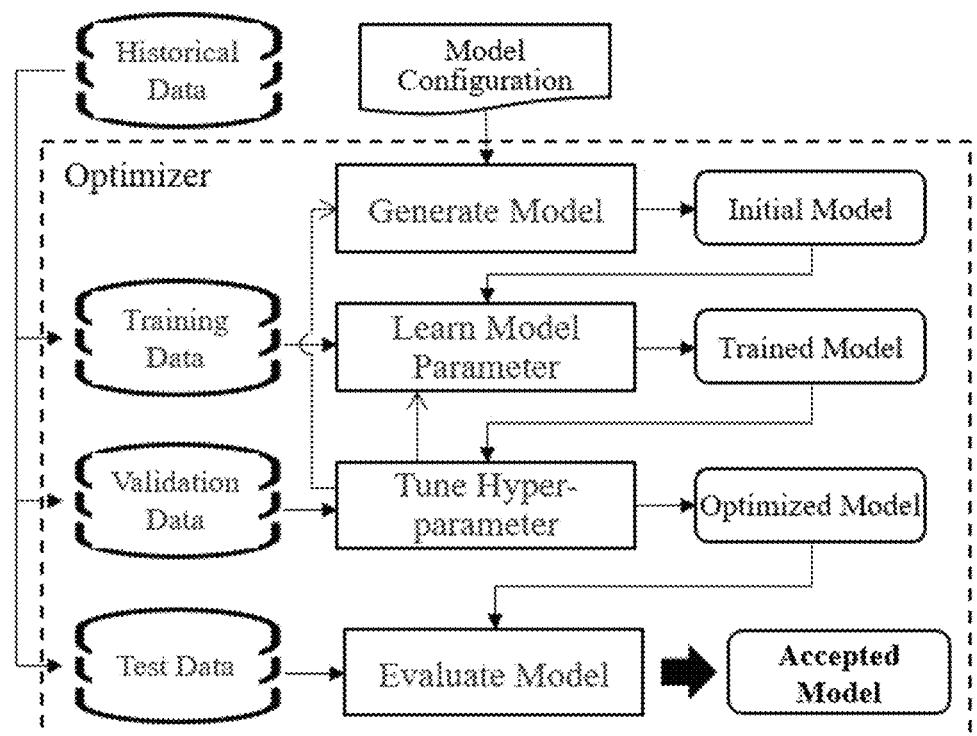
FIG. 4 is a block diagram of processes of generating a failure prediction model and optimizing the same according to the present invention.

The step of generating and optimizing a failure prediction model is performed through the optimizer 220 and further comprises the steps of: generating a prediction model, learning parameters of the prediction model, tuning hyper-parameters and evaluating the prediction model, as shown in FIG. 4. That is, the optimizer 220 generates the model based on prediction model configuration values, learns the generated prediction model, tunes the hyper-parameters and evaluates the learned prediction model and the tuned prediction model to prevent overfitting and to extract a prediction model which is above certain performance.

Historical data to be collected by the monitoring agent 110 of the collection module 100 for the generation and optimization of the prediction model are classified into training data, validation data and test data. The training data are used to optimize model parameters and the validation data are used to optimize hyper-parameters. The test data evaluate the performance of each optimized model and stop learning at an appropriate level, that is, stop learning when the performance is above a proper level. The data which are classified as described above prevent the test data used in evaluating the performance of the model from being used in optimizing the model or prevent the data used for the parameters of the model from being used in optimizing hyper-parameters, and as a result, prevent the model from overfitting to particular data only.

The algorithm used for optimization in the present invention is the Bayesian optimization and specifically applies the Gaussian process-based optimization. This tracks hyper-parameter values of strategically high performance, based on the probability theory. The tracking process is as follows: the performance when the other hyper-parameters are applied based on normal distribution is estimated to the performance of the prediction model regarding a part of the measured hyper-parameters, and a point having high possibility of performance improvement is probabilistically calculated and explored to faster find better hyper-parameters.

Figure 5:
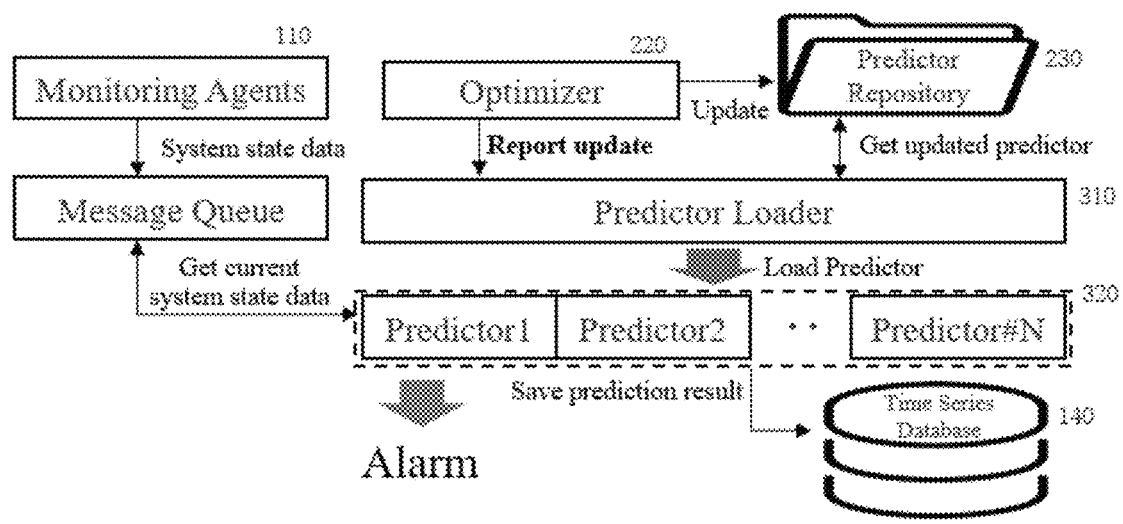
FIG. 5 is a flow chart of an online failure prediction process according to the present invention.

The step of predicting failure of the target system by using the failure prediction model as generated and storing results is performed by each of predictors 320 as shown in FIG. 5. The prediction model which is optimized and selected by the optimizer 220 is stored in a predictor repository 230. At the same time, when it is reported to a predictor loader 310 that the prediction model optimized by the optimizer 220 is updated in the predictor repository 230, the predictor loader 310 loads the prediction model stored in the predictor repository 230 and generates online predictors 320. Each of the online predictors 320 obtains the status data of the target system from the monitoring agent 110 and predicts the failure of the current target system and stores results.

As described above, the automatic prediction system for a server failure according to the present invention provides the processes from the data collection to the prediction model generation and the failure prediction application to the actual system together, thereby minimizing the costs for user intervention to generate an actual model. Further, since hyper-parameter values are strategically optimized based on the probability theory, the costs for optimization are reduced and the probability of extracting better hyper-parameter values increases, as a result, enabling to generate a better prediction model with less costs.

While the present invention has been particularly shown and described with reference to examples thereof, it will be understood by those of ordinary skill in the art that various modifications and alternative arrangements in form and details may be made therein without departing from the spirit and scope of the present invention as defined by the following claims. The scope of the claims, therefore, should be accorded the broadest interpretation so as to encompass all such modifications and similar arrangements.

The invention claimed is:

1. An automatic prediction system for a server failure comprising:
 a data collection module (100) to collect status information of a server and operating service of a target system;
 a model generation and optimization module (200) to generate a CNN-based failure prediction model by using the collected data and to optimize model parameters and hyper-parameter values; and
 a prediction module (300) to perform online failure prediction by using the optimized CNN-based failure prediction model,
wherein the data collection module (100) comprises:
 a monitoring agent (110) to periodically collect historical data indicating status of the server and operating service of the target system by detection plug-in;
 a failure detector (120) to detect failure data when a log error of the server of the target system occurs; and
 a data explorer (130) to check and analyze the collected data,
wherein the historical data are in the key-value form representing a data name and numerical value, the system sources to be collected as data are main memory, auxiliary memory, network and CPU and represent each source's source information, speed and utilization.

2. The automatic prediction system for a server failure in claim 1, wherein the model generation and optimization module (200) comprises:
 a configuration interpreter (210) to interpret model configuration information and transfer the interpreted model configuration information to an optimizer (220);
 the optimizer (220) to generate the prediction model based on the interpreted model configuration information, to optimize the model by applying machine learning and hyper-parameter tuning and to evaluate failure prediction performance; and
 a predictor repository (230) to store the optimized model.

3. The automatic prediction system for a server failure in claim 1, wherein the prediction module (300) comprises:
 a predictor loader (310) to generate online predictors (320) by calling the relevant model from the predictor repository (230) when receiving from the optimizer (220) a notice that a new prediction model is updated; and
 a number of online predictors (320) to predict a failure by receiving the information of the currently operating system and to warn a user when the probability of a failure occurrence exceeds a predetermined limit.

4. A method for automatically predicting server failure comprising the steps of:
 collecting historical data which include training data, validation data and test data and indicate the status of sources and operating services of a target system, through a monitoring agent (110) of a data collection module (100);
 generating a CNN-based failure prediction model and optimizing the model through an optimizer (220), based on model configuration values; and
 predicting a server failure of the target system by using the generated CNN-based failure prediction model and storing results,
wherein the step of generating and optimizing the failure prediction model further comprises the steps of:
 generating the CNN-based failure prediction model based on prediction model configuration values;
 learning parameters of the CNN-based failure prediction model by using the training data;
 tuning hyper-parameters by using the validation data; and
 evaluating the CNN-based failure prediction model by using the test data,
wherein the historical data are in the key-value form representing a data name and numerical value, the system sources to be collected as data are main memory, auxiliary memory, network and CPU and represent each source's source information, speed and utilization.

* * * * *